United States Patent
Kondo

(10) Patent No.: US 7,787,906 B2
(45) Date of Patent: Aug. 31, 2010

(54) BROADCAST INFORMATION TRANSMISSION

(75) Inventor: Takayuki Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 1245 days.

(21) Appl. No.: 11/257,161

(22) Filed: Oct. 25, 2005

(65) Prior Publication Data

US 2006/0094469 A1 May 4, 2006

(30) Foreign Application Priority Data

Nov. 2, 2004 (JP) ............................. 2004-319238

(51) Int. Cl.
H04B 1/38 (2006.01)
(52) U.S. Cl. ...................... 455/561; 455/67.11; 455/68; 455/69; 455/70
(58) Field of Classification Search ................. 455/561, 455/67.11, 68, 69, 70
See application file for complete search history.

(56) References Cited

U.S. PATENT DOCUMENTS

| | | | |
|---|---|---|---|
| 6,430,620 B1 * | 8/2002 | Omura et al. ............... | 709/231 |
| 6,738,646 B2 | 5/2004 | Miyoshi et al. | |
| 6,898,417 B1 | 5/2005 | Moulsley | |
| 6,959,199 B2 | 10/2005 | Ohkubo et al. | |
| 7,460,880 B2 | 12/2008 | Miyoshi et al. | |
| 2003/0087644 A1 | 5/2003 | Miyoshi et al. | |
| 2004/0228286 A1 * | 11/2004 | Kim et al. ................... | 370/252 |
| 2005/0009578 A1 * | 1/2005 | Liu ............................ | 455/574 |
| 2005/0227721 A1 * | 10/2005 | Nakao ........................ | 455/510 |
| 2008/0261545 A1 | 10/2008 | Miyoshi et al. | |

FOREIGN PATENT DOCUMENTS

| | | |
|---|---|---|
| EP | 1 401 152 A2 | 3/2004 |
| JP | 2001-292097 A | 10/2001 |
| JP | 2002-101043 A | 4/2002 |
| JP | 2002-526971 A | 8/2002 |
| JP | 2002-368684 A | 12/2002 |
| JP | 2004-128563 | 4/2004 |
| JP | 2004-193888 | 7/2004 |
| JP | 2004-193888 * | 8/2004 |
| WO | WO 03/105353 A2 | 12/2003 |

* cited by examiner

Primary Examiner—Vincent P Harper
Assistant Examiner—Fred A Casca
(74) Attorney, Agent, or Firm—Foley & Lardner LLP

(57) ABSTRACT

In a mobile communication system, broadcast information is transmitted from a radio base station to a mobile station. A transmission power calculation unit calculates the transmission power for transmitting resending data frames from the radio base station to the mobile station by a unicast transmission method. The transmission power calculation unit further calculates the transmission power for transmitting broadcast information from the radio base station to the mobile station by a broadcast transmission method such that the sum of the calculated transmission power and the transmission power for transmitting broadcast information from the radio base station to the mobile station by the broadcast transmission method is minimized. A transmission section of the radio base station transmits the broadcast information to the mobile station by the broadcast transmission method at the calculated transmission power.

5 Claims, 6 Drawing Sheets

BROADCAST INFORMATION TRANSMISSION

BACKGROUND OF THE INVENTION

1. Field of the Invention

The present invention relates to a radio base station, a mobile communication system, and a broadcast information transmission method for performing packet communication by broadcasting.

2. Description of the Related Art

In mobile communication systems in recent years, only the broadcast transmission method is used as the transmission method when broadcast information is transmitted from a radio base station to a plurality of mobile stations.

Referring to FIG. 1, a mobile communication system is shown that is composed of radio base station 601 and mobile station 602. Radio base station 601 includes transmission buffer 603, broadcast encoder 604, and transmission section 605. Mobile station 602 includes: reception section 606, broadcast decoder 607, reception buffer 608, and host application 609.

Transmission buffer 603 temporarily stores broadcast information that has been transmitted from other nodes. Broadcast encoder 604 encodes broadcast information that has been temporarily stored in transmission buffer 603 for transmission to mobile station 602 by the broadcast transmission method. Transmission section 605 transmits to mobile station 602 while consuming the power necessary for transmitting the encoded broadcast information by the broadcast transmission method. Reception section 606 receives the broadcast information that has been transmitted to mobile station 602. Broadcast decoder 607 decodes the broadcast information that has been received by reception section 606. Reception buffer 608 temporarily stores the broadcast information that has been decoded. Host application 609 processes the broadcast information that has been temporarily stored in reception buffer 608.

However, when there is a mobile station among the plurality of mobile stations that are the objects of transmission that is, for example, positioned in a location that is remote from the radio base station and in which reception quality is poor, such as a location close to the cell border, transmitting broadcast information by the broadcast transmission method results in an increase in the total transmission power and a deterioration of transmission efficiency.

As a response to this problem, means are provided for transmitting broadcast information by the unicast transmission method that uses individual channels for each of the plurality of mobile stations that are the objects of transmission. The transmission method is then selected depending on which method has the lowest total transmission power: transmission by the broadcast transmission method or transmission by the unicast transmission method that uses individual channels. A method in which transmission is realized by using this transmission method to reduce the total transmission power is disclosed in JP-A-2004-193888. In this case, the total transmission power is the sum of the power for transmitting data to each of the plurality of mobile stations that are the objects of transmission.

Further, when broadcast information is transmitted from a radio base station to a mobile station by the broadcast transmission method and an error occurs in the data that are received at the mobile station, a request to resend the data in which the error occurred is submitted to the radio base station using an individual channel. The radio base station, having received the request to resend, then separately resends the data in which the error occurred to the mobile station by the unicast transmission method that uses individual channels. A method for thus improving transmission efficiency is disclosed in JP-A-2004-12856.

However, in the method disclosed in the above-described JP-A-2004-193888, the problem arises that, when data are transmitted to each mobile station by the broadcast transmission method and errors occur in data that are received in a portion of the mobile stations among the mobile stations that receive data transmitted from the radio base station, requests for resending the data in which errors occurred are not submitted.

In addition, in the method that was disclosed in the above-described JP-A-2004-128563, no consideration is given to increasing the efficiency of the total transmission power for transmitting data.

SUMMARY OF THE INVENTION

It is an object of the present invention to provide a radio base station, a mobile communication system, and a broadcast information transmission method that enable efficient transmission of broadcast information.

In the present invention, the transmission power for transmitting to a mobile station by the unicast transmission method the resending data frames for which a resend request has been submitted from the mobile station is calculated at the radio base station. The transmission power for transmitting broadcast information to the mobile station by the broadcast transmission method is then calculated so as to minimize the sum of the transmission power that has been calculated and the transmission power for transmitting broadcast information to the mobile station by the broadcast transmission method. The broadcast information is transmitted to the mobile station by the broadcast transmission method at this calculated transmission power.

Accordingly, when transmitting broadcast information, transmissions can be realized by using minimum transmission power while ensuring communication quality.

The above and other objects, features, and advantages of the present invention will become apparent from the following description with reference to the accompanying drawings, which illustrate an example of the present invention.

DETAILED DESCRIPTION OF THE PREFERRED EMBODIMENTS

Figure 1:
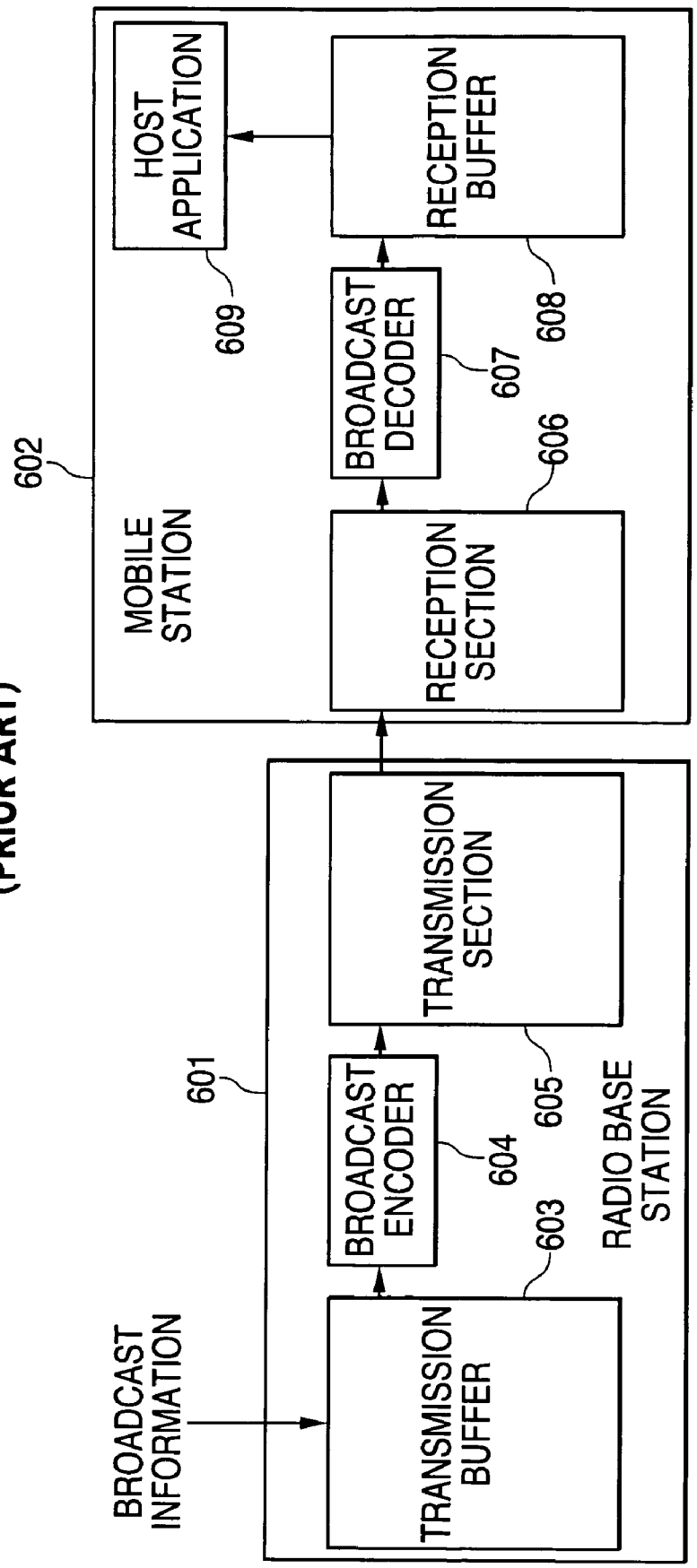
FIG. 1 shows the configuration in which broadcast information is transmitted from a radio base station to a mobile station by the broadcast transmission method.
Figure 2:
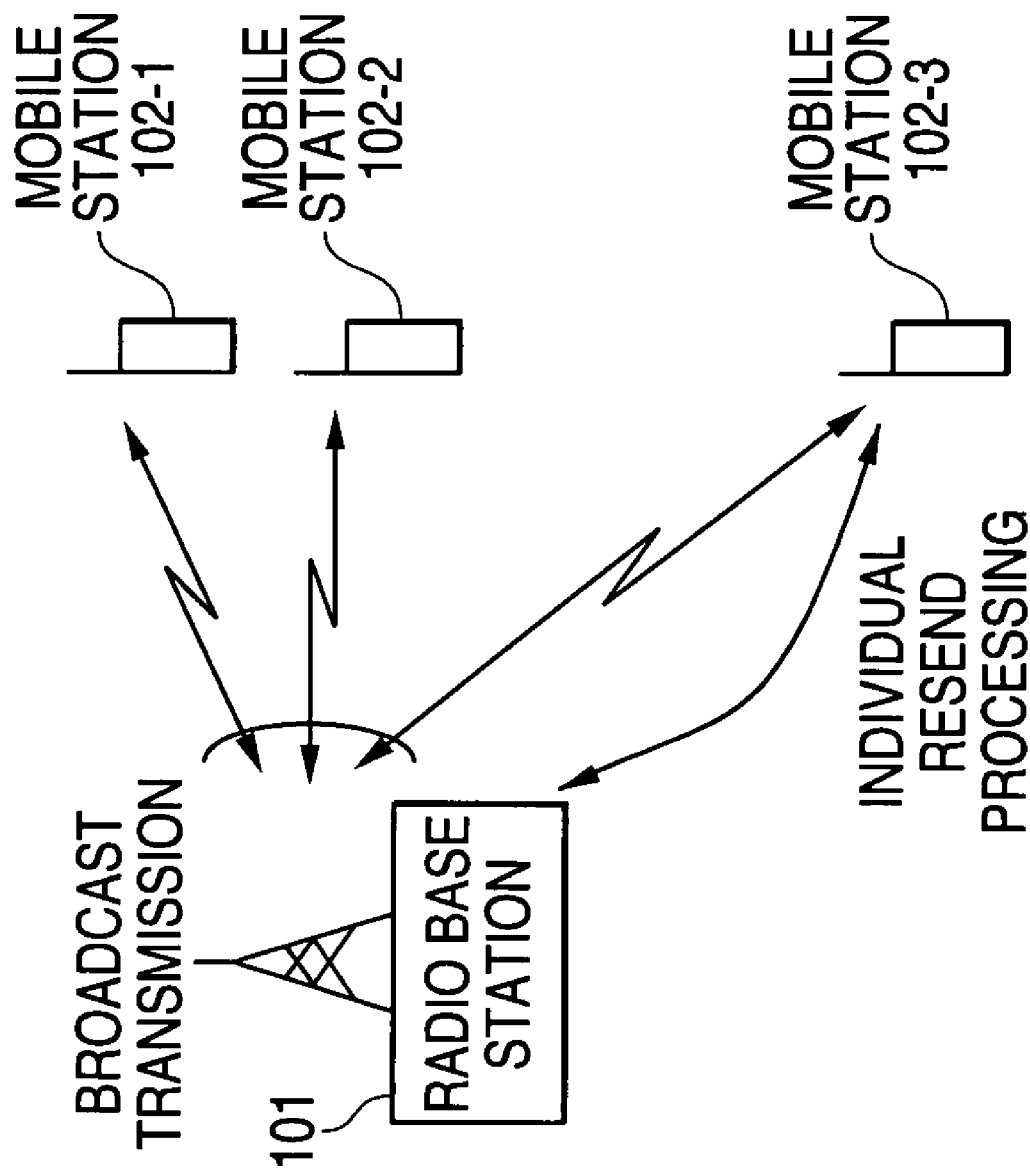
FIG. 2 shows the configuration of a mobile communication system that employs a radio base station and mobile stations according to an embodiment of the present invention.

Referring now to FIG. 2, a mobile communication system is depicted that is composed of radio base station 101 and a plurality of mobile stations 102-1-102-3. Radio base station 101 is connected to mobile stations 102-1-102-3 by radio links and transmits broadcast information to and from mobile stations 102-1-102-3. In addition, radio base station 101 is connected to an exchange (not shown) by way of a radio line control station (not shown) to enable the reception of broadcast information that has been transmitted from other nodes that are connected to the exchange. In addition, although only one radio base station 101 and three mobile stations 102-1-102-3 are shown in FIG. 2, the number of radio base stations and the number of mobile stations that are connected to a radio base station are not limited to these numbers.

Figure 3:
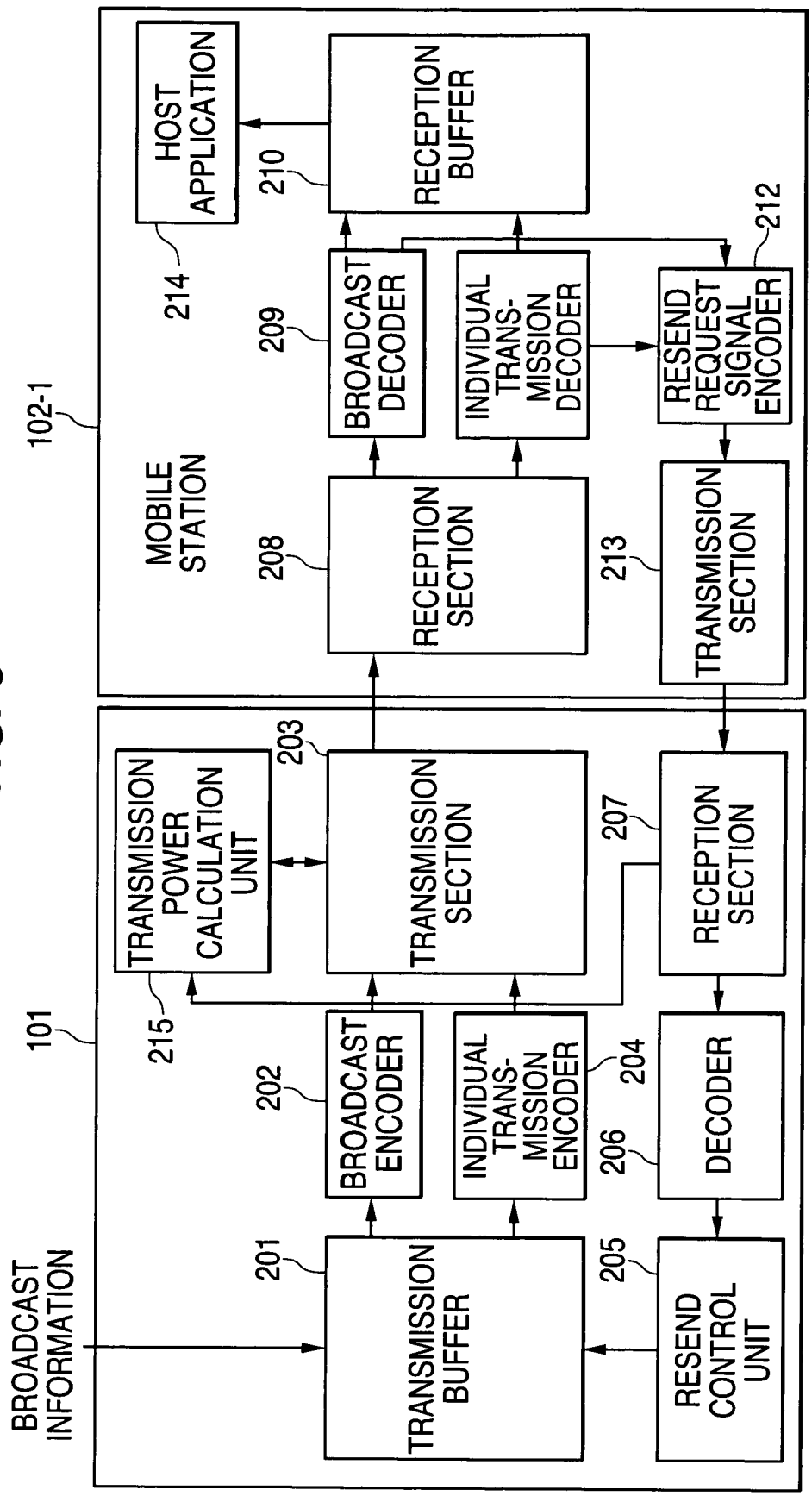
FIG. 3 shows the configuration for controlling the transmission and reception of broadcast information between a radio base station and the mobile stations that are shown in FIG. 2.

As shown in FIG. 3, radio base station 101 that is shown in FIG. 2 includes: transmission buffer 201, broadcast encoder 202, individual transmission encoder 204, transmission section 203, transmission power calculation unit 215, reception section 207, decoder 206, and resend control unit 205. Transmission buffer 201 temporarily stores broadcast information that has been transmitted from other nodes for transmission to mobile station 102-1. Broadcast encoder 202 encodes broadcast information that has been temporarily stored in transmission buffer 201 for transmission to mobile station 102-1 by the broadcast transmission method. Individual transmission encoder 204 encodes broadcast information that has been temporarily stored in transmission buffer 201 for transmission to mobile station 102-1 by a unicast transmission method that uses individual channels. Transmission section 203 transmits, to mobile station 102-1, the broadcast information that has been encoded by broadcast encoder 202 or by individual transmission encoder 204. Transmission power calculation unit 215 calculates the transmission power required to transmit broadcast information to mobile station 102-1 by transmission section 203. When an error occurs in broadcast information that has been transmitted to mobile station 102-1, reception section 207 receives a resend request signal from mobile station 102-1 requesting the resending of data in which the error occurred. Decoder 206 decodes the resend request signal that has been received by reception section 207. Resend control unit 205 controls transmission buffer 201 based on the resend request signal that has been decoded by decoder 206.

Further, mobile station 102-1 that is shown in FIG. 2 includes: reception section 208, broadcast decoder 209, individual transmission decoder 211, resend request signal encoder 212, transmission section 213, reception buffer 210, and host application 214. Reception section 208 receives broadcast information that has been transmitted from radio base station 101. Broadcast decoder 209 decodes the information that has been transmitted by the broadcast transmission method from among the broadcast information that has been received by reception section 208. Individual transmission decoder 211 decodes the information that has been transmitted by the unicast transmission method that uses individual channels from among the broadcast information that has been received by reception section 208. When an error has occurred in data that have been decoded by broadcast decoder 209 or by individual transmission decoder 211, resend request signal encoder 212 generates and encodes a resend request signal to submit a request to radio base station 101 for resending the data in which the error occurred. Transmission section 213 transmits the resend request signal that has been encoded by resend request signal encoder 212 to radio base station 101. Reception buffer 210 temporarily stores broadcast information that has been decoded by broadcast decoder 209 or by individual transmission decoder 211. Host application 214 processes the broadcast information that has been temporarily stored in reception buffer 210.

Figure 4:
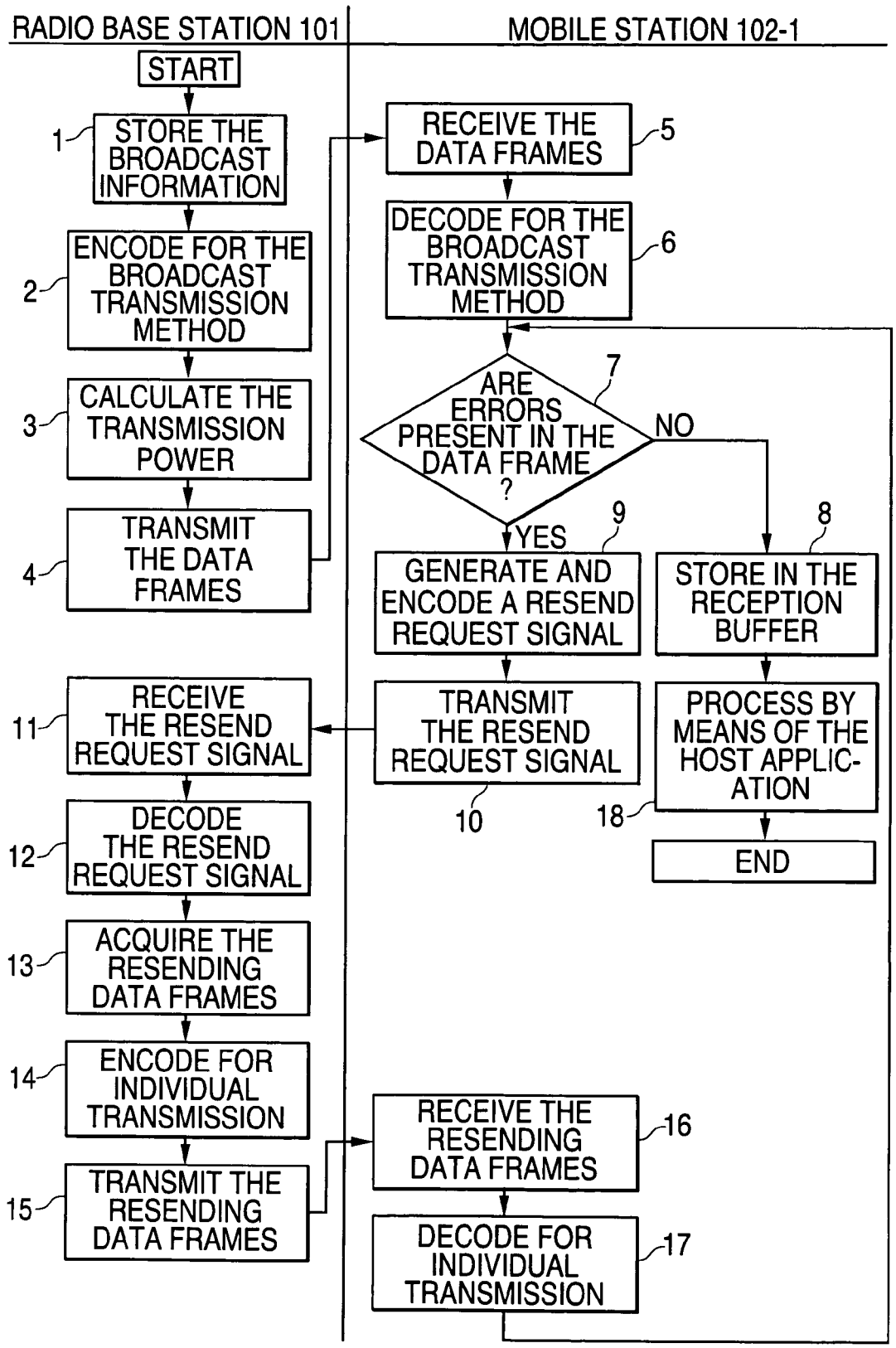
FIG. 4 is a flow chart for explaining the broadcast information transmission method in a radio base station and mobile station having the configuration that is shown in FIG. 3 in the mobile communication system that is shown in FIG. 2.

The following explanation regards the broadcast information transmission method in radio base station 101 and mobile station 102-1 with reference to FIG. 4.

In Step 1, broadcast information that has been transmitted in from another node is first stored in transmission buffer 201 in radio base station 101. At this time, the broadcast information is divided into data frames of an appropriate size and stored in transmission buffer 201 as data frames.

The data frames that have been stored in transmission buffer 201 are supplied as output to broadcast encoder 202, and in Step 2, broadcast encoder 202 encodes the data frames for use in the broadcast transmission method.

The data frames that have been encoded by broadcast encoder 202 are supplied as output to transmission section 203. In Step 3, the transmission power for transmitting the data frames to mobile station 102-1 by the broadcast transmission method is calculated by transmission power calculation unit 215. In addition, the transmission power for transmitting resending data frames by the unicast transmission method using an individual channel is also calculated. The transmission power is then calculated for transmission by the broadcast transmission method such that the total transmission power, which is the sum of these two powers, is minimized.

The transmission power for transmitting resending data frames by the unicast transmission method that uses individual channels may be set in advance in transmission power calculation unit 215. Alternatively, a position information signal or the resend request signal from mobile station 102-1 may be received by reception section 207, radiowave intensity information of the received signal may be supplied as output from reception section 207 to transmission power calculation unit 215, and the transmission power is then calculated based on the radiowave intensity information that has been received by transmission power calculation unit 215.

In addition, the transmission power for transmitting data frames by the broadcast transmission method is calculated such that the transmission power does not fall below a reference value that depends on the dynamic range of the broadcast channels of radio base station 101.

The data frames that have been encoded by broadcast encoder 202 are subsequently transmitted in Step 4 to mobile station 102-1 by the broadcast transmission method by means of the transmission power that has been calculated by transmission section 203.

The data frames that have been transmitted from radio base station 101 are received by reception section 208 in mobile station 102-1 in Step 5. The data frames that have been received are supplied as output from reception section 208 to broadcast decoder 209. The data frames are then subjected to decoding for use by the broadcast transmission method by broadcast decoder 209 in Step 6.

When the decoding for the broadcast transmission method is carried out by broadcast decoder 209, each data frame is checked in Step 7 to determine if errors exist. Data frames that are free of errors are supplied as output to reception buffer 210 and stored in Step 8.

If it is determined in Step 7 that a data frame contains an error, this finding is supplied as output from broadcast decoder 209 to resend request signal encoder 212. A resend request signal for requesting radio base station 101 to resend the data frame in which an error occurred is generated and encoded by resend request signal encoder 212 in Step 9.

The encoded resend request signal is supplied as output from resend request signal encoder 212 to transmission section 213. The encoded resend request signal is then transmitted from transmission section 213 to radio base station 101 using an individual channel in Step 10.

In Step 11, the resend request signal that has been transmitted from mobile station 102-1 is subsequently received by reception section 207 in radio base station 101. The resend request signal that has been received is supplied as output from reception section 207 to decoder 206 and then decoded by decoder 206 in Step 12.

The resend request signal that has been decoded by decoder 206 is next supplied to resend control unit 205. Resend control unit 205 determines the data frames that are to be resent based on the resend request signal and indicates these frames to transmission buffer 201. These data frames are then supplied as resending data frames from transmission buffer 201 to individual transmission encoder 204 in Step 13.

The resending data frames are encoded by individual transmission encoder 204 for transmission by the unicast transmission method that uses individual channels in Step 14, then supplied as output to transmission section 203, and finally, transmitted from transmission section 203 to mobile station 102-1 in Step 15.

In Step 16, the resending data frames that have been transmitted from radio base station 101 are received by reception section 208 in mobile station 102-1. The resending data frames that have been received are supplied as output from reception section 208 to individual transmission decoder 211. Individual transmission decoder 211 then decodes the resending data frames for use by the unicast transmission method that uses individual channels in Step 17.

When decoding for the unicast transmission method that uses individual channels by means of individual transmission decoder 211 occurs, the resending data frames are checked to determine whether errors are present in Step 7. If an error occurs in the resending data frames, processing from Step 9 to Step 17 is moreover carried out.

When processing from Step 9 to Step 17 is repeated, the maximum value of the number of repetitions can be set in advance, and a means can be provided for transmitting a warning signal to radio base station 101 when this maximum value has been exceeded.

In addition, the frame number (hereinbelow abbreviated as "FN") of data frames that have been received by mobile station 102-1 without error can be reported from mobile station 102-1 to radio base station 101 at preset cycles, and a means can be provided for deleting data frames of the FN that has been reported from transmission buffer 201 in radio base station 101.

If the resending data frames are free of errors, the resending data frames that have been decoded in individual transmission decoder 211 are supplied to reception buffer 210. The resending data frames are then stored in Step 8 by inserting them in appropriate positions among the stored data frames that were free of errors at the time of reception of the first data frames.

Data frames that have been stored in reception buffer 210 are processed as broadcast information by host application 214 in Step 18.

Figure 5:
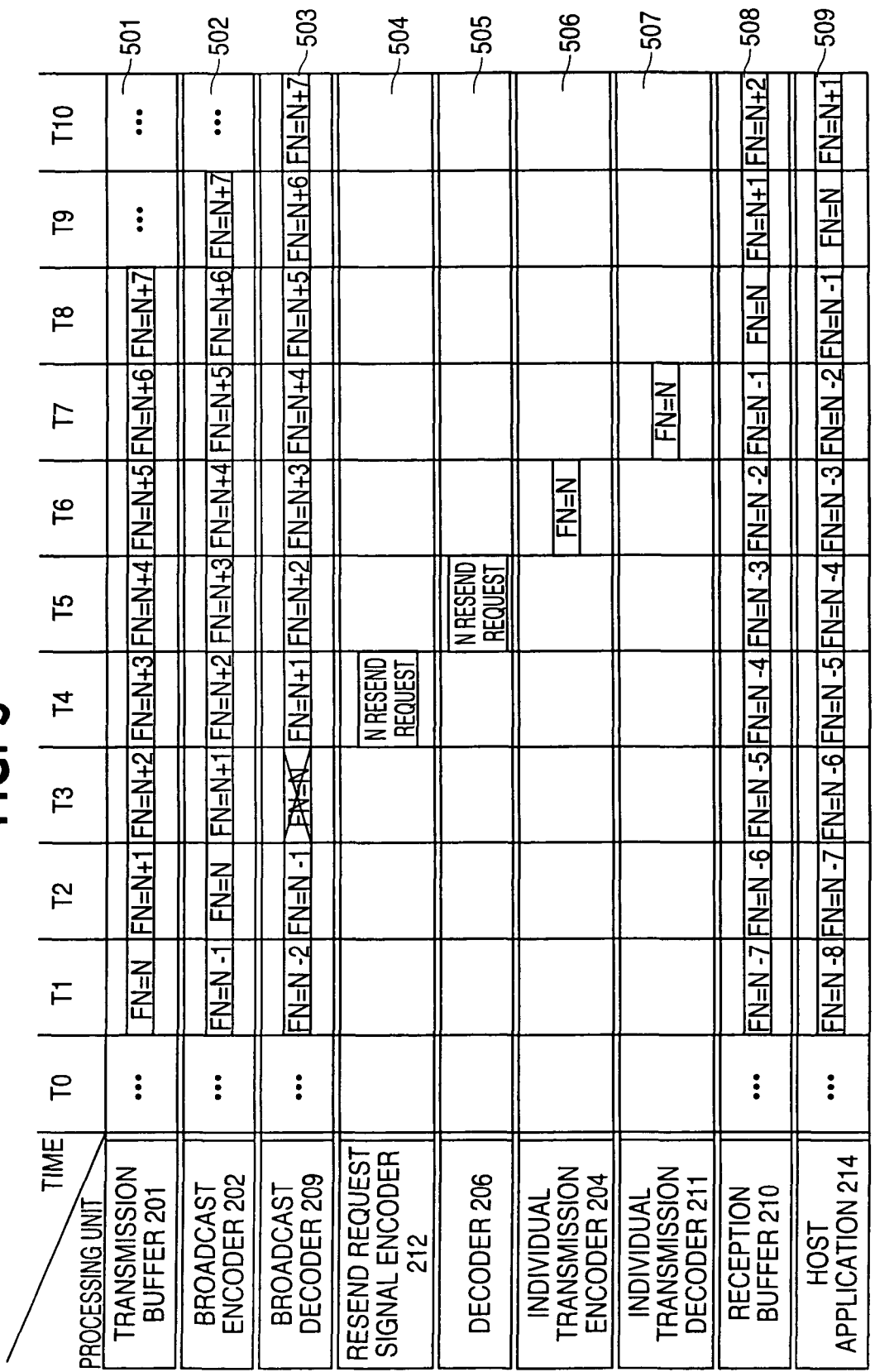
FIG. 5 is a timing chart for explaining an example of changes over time in processing for data frames that are transmitted and received in a radio base station and mobile station having the configuration that is shown in FIG. 3 in the mobile communication system that is shown in FIG. 2.

The following explanation with reference to FIG. 5 regards an example of the changes over time in the processing of data frames that are transmitted and received in radio base station 101 and mobile station 102-1.

Broadcast information that has been generated in another node is divided into, for example, data frames of an appropriate size, FNs are conferred sequentially to each data frame, and the data frames are then stored in transmission buffer 201 in radio base station 101. The data frames that have been stored in transmission buffer 201 are supplied as output to broadcast encoder 202 in Step 501 as shown by time slots T0-T10, whereby the data frame for which FN=N is supplied at time slot T1, the data frame for which FN=N+1 is supplied at time slot T2, and so on.

The data frames that have been received as input by broadcast encoder 202 are encoded for transmission by the broadcast transmission method, and transmitted to mobile station 102-1 by way of transmission section 203 by shifting one time slot at a time in Step 502.

Data frames that have been received by reception section 208 in mobile station 102-1 are supplied as output from reception section 208 to broadcast decoder 209. The data frames are then decoded by broadcast decoder 209 and arranged in each time slot in Step 503.

When an error occurs in, for example, the data frame for which FN=N, notification that an error occurred in the data frame for which FN=N is supplied to resend request signal encoder 212.

On the other hand, data frames other than the frame for which FN=N and that are free of errors are supplied as output from broadcast decoder 209 to reception buffer 210 and stored in reception buffer 210.

Resend request signal encoder 212, having received notification that an error exists in the data frame for which FN=N, generates and encodes a resend request signal to request radio base station 101 to resend the data frame for which FN=N.

In Step 504, the encoded resend request signal is transmitted to radio base station 101 by way of transmission section 213 in time slot T4 using an individual channel.

When the resend request signal that is transmitted from mobile station 102-1 is received by reception section 207 in radio base station 101, the received resend request signal is supplied from reception section 207 to decoder 206 and the resend request signal is then decoded in decoder 206.

The decoded resend request signal is supplied from decoder 206 to resend control unit 205 in Step 505. Resend control unit 205 requests that relevant data stored in transmission buffer 201 be resent, and this data frame is then supplied as a resending data frame from transmission buffer 201 to individual transmission encoder 204.

Individual transmission encoder 204 then encodes the resending data frame for transmission by the unicast transmission method that uses an individual channel. The encoded resending data frame is then transmitted to mobile station 102-1 by way of transmission section 203 by the unicast transmission method that uses an individual channel in Step 506.

When the resending data frame that has been transmitted from radio base station 101 is received by reception section 208 in mobile station 102-1, this data frame is supplied as output from reception section 208 to individual transmission decoder 211. Individual transmission decoder 211 then subjects the resending data frame to decoding for use by the unicast transmission method that uses an individual channel in Step 507.

The decoded resending data frame is supplied to reception buffer 210. The resending data frame is then stored in reception buffer 210 in Step 508 in accordance with the FN values by inserting it into the appropriate position among the stored data frames that were free of errors at the time of reception of the first data frames.

The data frames that have been stored in reception buffer 210 are acquired in Step 509 by host application 214 at timing that is subsequent to time slot T9 and the broadcast information is processed by host protocol.

The individual channels that are used in the resending process may be, for example, dedicated physical channels such as DCH (DPCH) in a W-CDMA system. Alternatively, the individual channels may be dedicated logical channels on common channels such as RACH (PRACH)/FACH (S-CCPCH).

Figure 6:
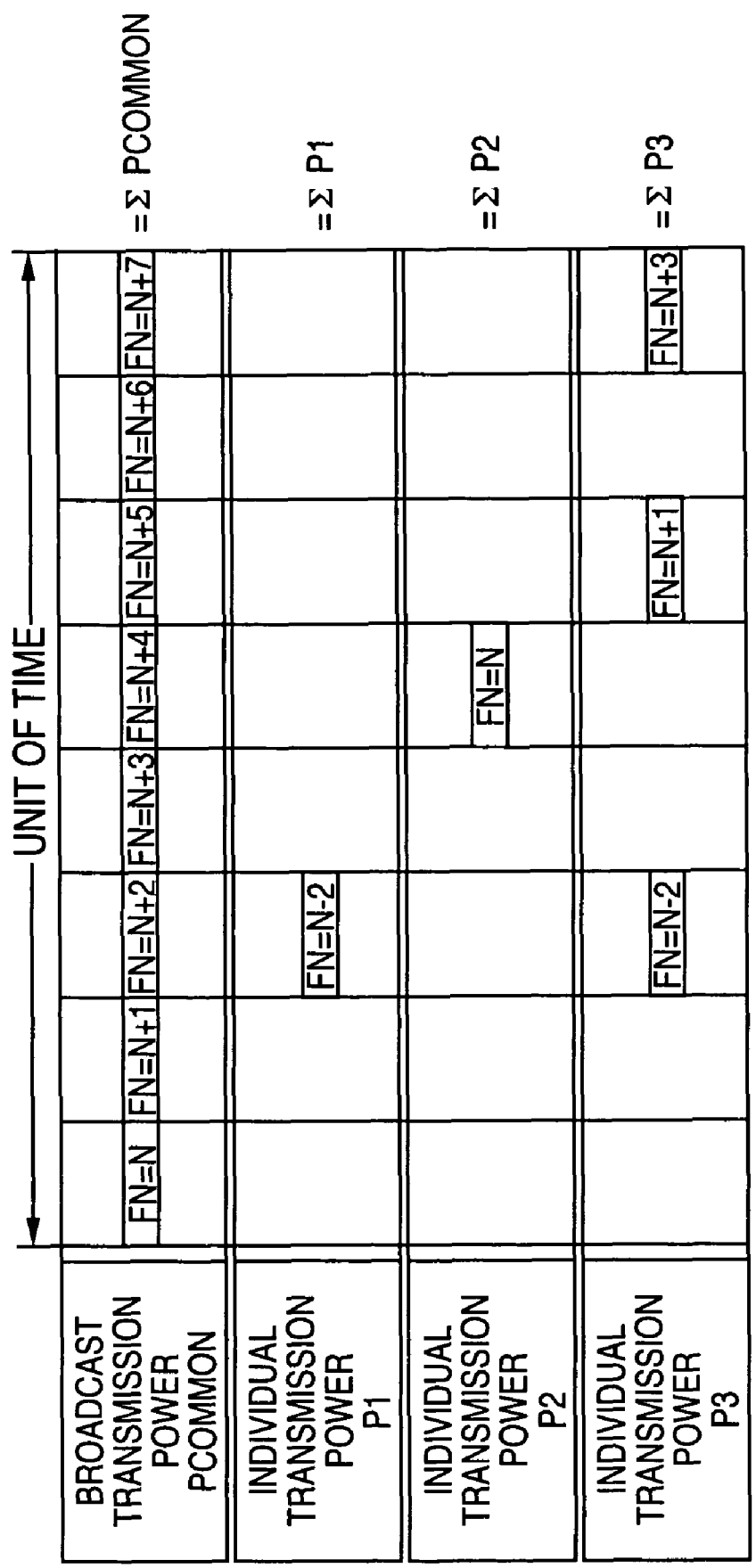
FIG. 6 is a view for explaining an example of the process for minimizing the total transmission power in a radio base station and mobile station having the configuration that is shown in FIG. 3 in the mobile communication system that is shown in FIG. 2.

The following explanation with reference to FIG. 6 regards the process of minimizing the total transmission power in radio base station 101.

As shown in FIG. 6, Pcommon is the transmission power for transmitting broadcast information by the broadcast transmission method. In addition, regarding the transmission power for transmitting the resending data frames of broadcast information by the unicast transmission method that uses individual channels, the transmission power to mobile stations 102-1-102-3 is P1-P3, respectively. The average transmission power per unit of time of Pcommon, P1, P2, and P3 is ΣPcommon, ΣP1, ΣP2, and ΣP3, respectively.

The resending data frames that are resent to mobile stations 102-1-102-3 are: the data frame for which FN=N−2 for mobile station 102-1, the data frame for which FN=N for mobile station 102-2, and the data frames for which FN=N−2, N+1 and N+3 for mobile station 102-3.

Accordingly, ΣP1 is the power for the transmission by radio base station 101 to mobile station 102-1 of the data frame for which FN=N−2 by the unicast transmission method using an individual channel, ΣP2 is the power for the transmission by radio base station 101 to mobile station 102-2 of data frame for which FN=N by the unicast transmission method using an individual channel, and ΣP3 is the power for the transmission by radio base station 101 to mobile station 102-3 of the data frames for which FN=N−2, FN=N+1 and FN=N+3 by the unicast transmission method using an individual channel.

If the total transmission power for transmitting the broadcast information is defined to be ΣPcommon+ΣP1+ΣP2+ΣP3, transmission power calculation unit 215 calculates the total transmission power (ΣPcommon+ΣP1+ΣP2+ΣP3) for transmitting the broadcast information and controls ΣPcommon such that this value is reduced.

For example, as shown below, control is implemented such that Pcommon is increased until the amount of increase of ΣPcommon is greater than the amount of decrease of (ΣP1+ΣP2+ΣP3).

When the amount of increase of ΣPcommon is less than the amount of decrease of (ΣP1+ΣP2+ΣP3) during the increase of Pcommon, Pcommon continues to be increased. On the other hand, when the amount of increase of ΣPcommon is greater than the amount of decrease of (ΣP1+ΣP2+ΣP3), Pcommon is decreased.

In contrast, when the amount of decrease of ΣPcommon is greater than the amount of increase of (ΣP1+ΣP2+ΣP3) during decrease of Pcommon, Pcommon continues to be decreased, but when the amount of decrease of ΣPcommon is less than the amount of increase of (ΣP1+ΣP2+ΣP3), Pcommon is increased.

While a preferred embodiment of the present invention has been described using specific terms, such description is for illustrative purposes only, and it is to be understood that changes and variations may be made without departing from the spirit or scope of the following claims.

What is claimed is:

1. A radio base station comprising:
   a transmission buffer for dividing broadcast information that is to be transmitted to mobile stations into data frames and storing said data frames;
   a broadcast encoding means for encoding data frames that have been stored in said transmission buffer for transmission by a broadcast transmission method;
   a reception means for receiving a resend request signal for requesting the resending of said data frames;
   a decoding means for decoding a resend request signal that has been received by said reception means;
   a resend control means for controlling the output of data frames for which resending has been requested from said transmission buffer as resending data frames based on a resend request signal that has been decoded by said decoding means;
   an individual transmission encoding means for encoding for transmission by a unicast transmission method that uses individual channels for said resending data frames;
   a transmission power calculation means for both calculating the transmission power of said resending data frames to said mobile station by said unicast transmission method based on a resend request signal that has been received by said reception means, and for calculating the transmission power of said data frames by said broadcast transmission method such that the sum of the transmission power of the resending data frames and the transmission power of said data frames by said broadcast transmission method is minimized, and moreover, such that said sum does not fall below a reference value that depends on the dynamic range of the broadcast channel of said radio base station; and
   a transmission means for transmitting to said mobile station data frames that have been encoded by said broadcast encoding means or resending data frames that have been encoded by said individual transmission encoding means by the transmission power that has been calculated by said transmission power calculation means,
   wherein the transmission means comprises:
   transmission power increasing means for increasing the transmission power of said data frames by said broadcast transmission method over a fixed period of time,
   wherein the transmission power calculation means comprises:
   first transmission power calculation means for calculating the transmission power of said resending data frames by said unicast transmission method to said mobile station at a first unit of time when the increasing step started; and
   second transmission power calculation means for calculating the transmission power of said resending data frames by said unicast transmission method to said mobile station at a second unit of time when the increasing step ended, the second unit of time occurring after the first unit of time,
   wherein, based on whether the sum of the transmission power of the resending data frames and the transmission power of said data frames by said broadcast transmission method calculated at the first unit of time is greater or less than the sum of the transmission power of the resending data frames and the transmission power of said data frames by said broadcast transmission method calculated at the second unit of time, the transmission power of said data frames by said broadcast transmission method is set to either a first transmission power corresponding to a transmission power at the first unit of time or to a second transmission power corresponding to a transmission power at the second unit of time.

2. A mobile communication system, comprising at least a mobile station and a radio base station for transmitting broadcast information to said mobile station; wherein said radio base station comprises:

a transmission buffer for dividing said broadcast information into data frames and storing the data frames;

a broadcast encoding means for encoding data frames that have been stored in said transmission buffer for transmission by a broadcast transmission method;

a reception means for receiving a resend request signal for requesting resending of said data frames;

a decoding means for decoding a resend request signal that has been received by said reception means;

a resend control means for controlling the output of data frames for which resending has been requested from said transmission buffer as resending data frames based on a resend request signal that has been decoded by said decoding means;

an individual transmission encoding means for encoding said resending data frames for transmission by a unicast transmission method that uses individual channels;

a transmission power calculation means for both calculating the transmission power of said resending data frames to said mobile station by said unicast transmission method based on a resend request signal that has been received by said reception means, and for calculating the transmission power of said data frames by said broadcast transmission method such that the sum of the transmission power of the resending data frames and the transmission power of said data frames by said broadcast transmission method is minimized, and moreover, such that said sum does not fall below a reference value that depends on the dynamic range of the broadcast channel of said radio base station; and a transmission means for transmitting to said mobile station data frames that have been encoded by said broadcast encoding means or resending data frames that have been encoded by said individual transmission encoding means by the transmission power that has been calculated by said transmission power calculation means, wherein the transmission means comprises:

transmission power increasing means for increasing the transmission power of said data frames by said broadcast transmission method over a fixed period of time, wherein the transmission power calculation means comprises:

first transmission power calculation means for calculating the transmission power of said resending data frames by said unicast transmission method to said mobile station at a first unit of time when the increasing step started; and second transmission power calculation means for calculating the transmission power of said resending data frames by said unicast transmission method to said mobile station at a second unit of time when the increasing step ended, the second unit of time occurring after the first unit of time, wherein, based on whether the sum of the transmission power of the resending data frames and the transmission power of said data frames by said broadcast transmission method calculated at the first unit of time is greater or less than the sum of the transmission power of the resending data frames and the transmission power of said data frames by said broadcast transmission method calculated at the second unit of time, the transmission power of said data frames by said broadcast transmission method is set to either a first transmission power corresponding to a transmission power at the first unit of time or to a second transmission power corresponding to a transmission power at the second unit of time.

3. A method, by a radio base station that is connected to a mobile station by a radio link, for encoding data frames that have been stored in a transmission buffer for transmission by a broadcast transmission method and for transmitting them to said mobile station; said method comprising steps of:

when a resend request signal for requesting the resending of data frames is received from said mobile station, supplying data frames for which resending has been requested based on the resend request signal from said transmission buffer as resending data frames;

encoding for transmission by a unicast transmission method that uses individual channels for said resending data frames;

calculating the transmission power of said resending data frames by said unicast transmission method to said mobile station based on the resend request signal that has been received;

calculating the transmission power of said data frames by said broadcast transmission method such that the sum of the transmission power of the resending data frames and the transmission power of said data frames by said broadcast transmission method is minimized, and moreover, such said sum does not fall below a reference value that depends on the dynamic range of the broadcast channel of said radio base station; and transmitting said encoded data frames or resending data frames to said mobile station at said transmission power, wherein the transmitting step comprises:

increasing the transmission power of said data frames by said broadcast transmission method over a fixed period of time, wherein the calculating the transmission power of said resending data frames step comprises:

calculating the transmission power of said resending data frames by said unicast transmission method to said mobile station at a first unit of time when the increasing step started; and calculating the transmission power of said resending data frames by said unicast transmission method to said mobile station at a second unit of time when the increasing step ended, the second unit of time occurring after the first unit of time, wherein, based on whether the sum of the transmission power of the resending data frames and the transmission power of said data frames by said broadcast transmission method calculated at the first unit of time is greater or less than the sum of the transmission power of the resending data frames and the transmission power of said data frames by said broadcast transmission method calculated at the second unit of time, the transmission power of said data frames by said broadcast transmission method is set to either a first transmission power corresponding to a transmission power at the first unit of time or to a second transmission power corresponding to a transmission power at the second unit of time.

4. A radio base station comprising:

a transmission buffer for dividing broadcast information that is to be transmitted to mobile stations into data frames and storing said data frames;

a broadcast encoding unit configured to encode data frames that have been stored in said transmission buffer for transmission by a broadcast transmission method;

a reception unit configured to receive a resend request signal for requesting the resending of said data frames;

a decoding unit configured to decode a resend request signal that has been received by said reception unit;

a resend control unit configured to control the output of data frames for which resending has been requested from said transmission buffer as resending data frames based on a resend request signal that has been decoded by said decoding unit;

an individual transmission encoding unit configured to encode for transmission by a unicast transmission method that uses individual channels for said resending data frames;

a transmission power calculation unit configured to calculate the transmission power of said resending data frames to said mobile station by said unicast transmission method based on a resend request signal that has been received by said reception unit, and for configured to calculate the transmission power of said data frames by said broadcast transmission method such that the sum of the transmission power of the resending data frames and the transmission power of said data frames by said broadcast transmission method is minimized, and moreover, such that said sum does not fall below a reference value that depends on the dynamic range of the broadcast channel of said radio base station; and a transmission unit configured to transmit to said mobile station data frames that have been encoded by said broadcast encoding unit or resending data frames that have been encoded by said individual transmission encoding unit by the transmission power that has been calculated by said transmission power calculation unit, wherein the transmission unit comprises:

a transmission power increasing unit configured to increase the transmission power of said data frames by said broadcast transmission method over a fixed period of time, wherein the transmission power calculation unit comprises:

a first calculating unit configured to calculate the transmission power of said resending data frames by said unicast transmission method to said mobile station at a first unit of time when the increasing step started; and a second calculating unit configured to calculate the transmission power of said resending data frames by said unicast transmission method to said mobile station at a second unit of time when the increasing step ended, the second unit of time occurring after the first unit of time, wherein, based on whether the sum of the transmission power of the resending data frames and the transmission power of said data frames by said broadcast transmission method calculated at the first unit of time is greater or less than the sum of the transmission power of the resending data frames and the transmission power of said data frames by said broadcast transmission method calculated at the second unit of time, the transmission power of said data frames by said broadcast transmission method is set to either a first transmission power corresponding to a transmission power at the first unit of time or to a second transmission power corresponding to a transmission power at the second unit of time.

5. A mobile communication system, comprising at least a mobile station and a radio base station for transmitting broadcast information to said mobile station; wherein said radio base station comprises:

a transmission buffer for dividing said broadcast information into data frames and storing the data frames;

a broadcast encoding unit configured to encode data frames that have been stored in said transmission buffer for transmission by a broadcast transmission method;

a reception unit configured to receive a resend request signal for requesting resending of said data frames;

a decoding unit configured to decode a resend request signal that has been received by said reception unit;

a resend control unit configured to control the output of data frames for which resending has been requested from said transmission buffer as resending data frames based on a resend request signal that has been decoded by said decoding unit;

an individual transmission encoding unit configured to encode said resending data frames for transmission by a unicast transmission method that uses individual channels;

a transmission power calculation unit configured to calculate the transmission power of said resending data frames to said mobile station by said unicast transmission method based on a resend request signal that has been received by said reception unit, and configured to calculate the transmission power of said data frames by said broadcast transmission method such that the sum of the transmission power of the resending data frames and the transmission power of said data frames by said broadcast transmission method is minimized, and moreover, such that said sum does not fall below a reference value that depends on the dynamic range of the broadcast channel of said radio base station; and a transmission unit configured to transmit to said mobile station data frames that have been encoded by said broadcast encoding unit or resending data frames that have been encoded by said individual transmission encoding unit by the transmission power that has been calculated by said transmission power calculation unit, wherein the transmission unit comprises:

a transmission power increasing unit configured to increase the transmission power of said data frames by said broadcast transmission method over a fixed period of time, wherein the transmission power calculation unit comprises:

a first calculating unit configured to calculate the transmission power of said resending data frames by said unicast transmission method to said mobile station at a first unit of time when the increasing step started; and a second calculating unit configured to calculate the transmission power of said resending data frames by said unicast transmission method to said mobile station at a second unit of time when the increasing step ended, the second unit of time occurring after the first unit of time, wherein, based on whether the sum of the transmission power of the resending data frames and the transmission power of said data frames by said broadcast transmission method calculated at the first unit of time is greater or less than the sum of the transmission power of the resending data frames and the transmission power of said data frames by said broadcast transmission method calculated at the second unit of time, the transmission power of said data frames by said broadcast transmission method is set to either a first transmission power corresponding to a transmission power at the first unit of time or to a second transmission power corresponding to a transmission power at the second unit of time.

* * * * *